US011689982B2

(12) United States Patent
Huang et al.

(10) Patent No.: US 11,689,982 B2
(45) Date of Patent: Jun. 27, 2023

(54) WEIGHTED MEC SELECTION FOR APPLICATION-BASED MEC TRAFFIC STEERING

(71) Applicant: Verizon Patent and Licensing Inc., Basking Ridge, NJ (US)

(72) Inventors: Ye Huang, San Ramon, CA (US); Sudhakar Reddy Patil, Flower Mound, TX (US); Maqbool Chauhan, Keller, TX (US); Joseph Lee, Frisco, TX (US); Miguel A. Carames, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/409,989

(22) Filed: Aug. 24, 2021

(65) Prior Publication Data

US 2023/0060348 A1     Mar. 2, 2023

(51) Int. Cl.
*H04W 36/22* (2009.01)
*H04W 36/00* (2009.01)
*H04W 28/02* (2009.01)

(52) U.S. Cl.
CPC ....... *H04W 36/22* (2013.01); *H04W 28/0226* (2013.01); *H04W 28/0236* (2013.01); *H04W 28/0247* (2013.01); *H04W 36/0058* (2018.08); *H04W 36/0088* (2013.01)

(58) Field of Classification Search
None
See application file for complete search history.

(56) References Cited

U.S. PATENT DOCUMENTS

| 2019/0261260 A1* | 8/2019 | Dao | H04W 48/18 |
| 2020/0120665 A1* | 4/2020 | Jin | H04W 72/042 |
| 2020/0136978 A1* | 4/2020 | Li | H04L 67/141 |
| 2020/0154459 A1* | 5/2020 | Mukherjee | H04L 65/80 |

FOREIGN PATENT DOCUMENTS

| WO | WO 2019118964 | * | 6/2019 |
| WO | WO 2021031562 | * | 3/2020 |

* cited by examiner

*Primary Examiner* — Mohammad S Adhami

(57) ABSTRACT

A network device receives location information for a user equipment device (UE), an application identifier (ID), and a latency requirement associated with a data session involving the UE. The network device retrieves from a database, based on the UE's location information, the application ID, and the latency requirement, Multi-Access Edge Computing (MEC) selection weight values associated with multiple MEC platforms. The network device selects a MEC platform, from among the multiple MEC platforms, based on the retrieved MEC selection weight values, and causes the data session to be established between the selected MEC platform and the UE.

20 Claims, 12 Drawing Sheets

WEIGHTED MEC SELECTION FOR APPLICATION-BASED MEC TRAFFIC STEERING

BACKGROUND

Edge computing may involve a cloud-based Information Technology (IT) service environment located at an edge of a network. One of the purposes of edge computing is to enable high-bandwidth, low-latency access by deploying latency-sensitive applications at the edge of the network closer to an end user. Another goal of edge computing is to reduce network congestion and improve application performance by optimizing the location where task processing is performed, thereby improving the delivery of content and application services to the end users and reducing transport costs for high bandwidth services. Applications where edge computing is highly desirable may involve areas related to on-line gaming, augmented reality (AR), virtual reality (VR), wirelessly connected vehicles, and Internet of Things (IoT) applications (e.g., industry 4.0 applications). Additionally, edge computing can be beneficial in large public venues and enterprise organizations where services are delivered to onsite consumers from an edge server located at or near the venue or enterprise premises. In such large-scale use cases, content may be locally produced, stored, processed, and/or delivered from an edge server, thus, ensuring reduced backhaul, low latency, or even ultra-low latency.

DETAILED DESCRIPTION OF EXAMPLE EMBODIMENTS

Figure 1:
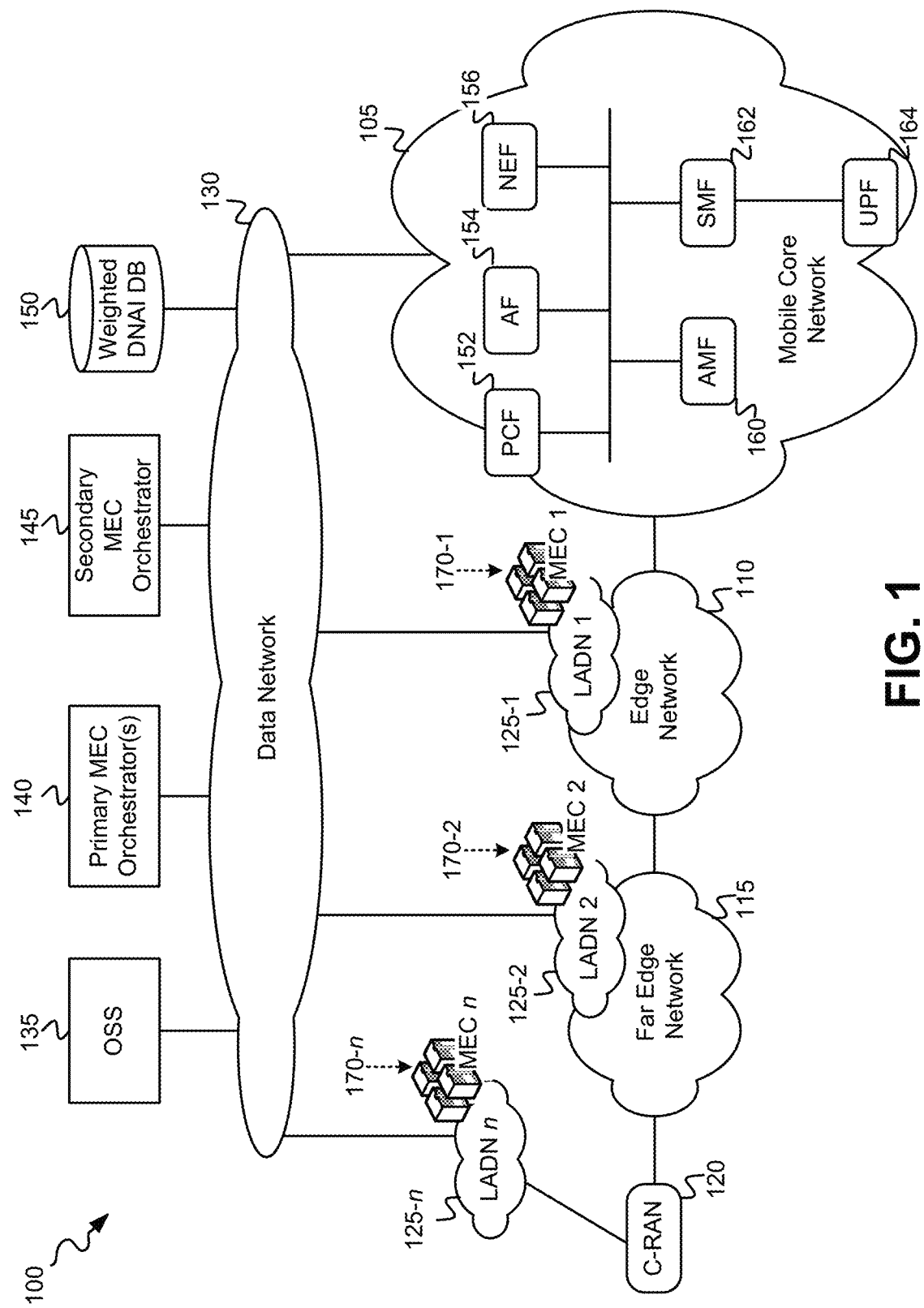
FIG. 1 illustrates an example network environment in which Multi-Access Edge Computing (MEC) selection weight values may be used for steering traffic to one of multiple MEC platforms.

The following detailed description refers to the accompanying drawings. The same reference numbers in different drawings may identify the same or similar elements. The following detailed description does not limit the invention.

Multi-Access Edge Computing (MEC) is one type of edge computing. MEC may move the processing, storing, and/or delivery of traffic and services from a centralized network (e.g., a mobile core network) to a data center(s) residing at an edge location (e.g., an edge network) connected to the edge of the centralized network, closer to the end user. A MEC platform is typically deployed at the edge location, and one or more applications are installed upon the MEC platform. The MEC platform may, for example, include at least one MEC data center and may connect to a Local Access Data Network (LADN) that further connects to the edge network. MEC platforms may be connected to cloud Radio Access Networks (C-RANs), far edge networks, and/or edge networks such that data transport associated with sessions involving the different MEC platforms have different associated latencies. For example, a MEC platform connected at a C-RAN may have an associated latency for sessions processed with applications at the MEC platform that is lower than a latency for another MEC platform connected at a far edge or edge network. Further, a MEC platform connected at a far edge network may have an associated latency for sessions processed with applications at the MEC platform that is lower than a latency for another MEC platform connected at an edge network. Additionally, a MEC platform connected at a C-RAN, far edge network, or edge network may have an associated latency for sessions processed with applications at the MEC platform that is lower than a latency for network devices that connect to the core mobile network and not via the C-RAN, far edge network, or edge network.

When MEC platforms are installed and commissioned by third party MEC developers, as opposed to the mobile network service provider, the third party MEC developers typically configure the MEC platforms with static MEC geo-location information (e.g., static Data Network Access Identifiers (DNAIs)) that the mobile network service provider relies on to perform MEC traffic steering. Further, current MEC steering techniques include no ability by the mobile network service provider to take into account a current status of applications at third party developed MEC platforms. Example implementations described herein enable MEC traffic steering to be applied to mobile network service provider owned MEC platforms and third party developed MEC platforms that dynamically takes into account a current user equipment device (UE) location, a current application status, and one or more network performance parameters (e.g., latency) associated with each of the MEC platforms. As described herein, a centralized database keeps track of current MEC platform profile information and generates a MEC selection weight value for each MEC platform to which traffic may be steered. The MEC selection weight value may be used by the mobile network service provider for assessing the "cost" associated with steering session traffic to particular MEC platforms based on a current UE location, the application involved in the session, and possibly the current status of the application. A network function (e.g., a component of the mobile network service provider) may query the centralized database to retrieve current updated MEC selection weight values for each MEC platform, and steer traffic to a particular MEC platform based on the updated MEC selection weight values.

FIG. 1 illustrates an example network environment 100 in which MEC selection weight values may be used for steering traffic to one of multiple MEC platforms connected at either a C-RAN, a far edge network, or an edge network.

Network environment 100 may include a core network 105, an edge network 110, a far edge network 115, a C-RAN 120, local area data networks (LADNs) 125-1 through 125-n, a data network 130, an Operations Support System (OSS) 135, a primary MEC orchestrator 140, a secondary MEC orchestrator 145, and a weighted DNAI database (DB) 150.

Core network 105 may include core components of any type of a wireless mobile network that provides wireless access to subscribing UEs (not shown). In the implementation depicted in FIG. 1, core network 105 includes a Next Generation Mobile network such as, for example, a Fifth Generation (5G) mobile network. In some implementations, however, core network 105 may include other types of mobile network such as, for example, a Fourth Generation (4G), a 4.5G Long Term Evolution (LTE), or a hybrid 4G/5G mobile network.

Core network 105 may include various different network functions (NFs) that operate in cooperation with one another to provide wireless network services to UEs. In the case of a 5G wireless network, such as shown in FIG. 1, the core components may include, among other Network Function (NF) components, a Policy Control Function (PCF) 152, an Application Function (AF) 154, a Network Exposure Function (NEF) 156, an Access and Mobility Management Function (AMF) 160, a Session Management Function (SMF) 162, and a User Plane Function (UPF) 164. Each of the NFs 152-164 may be implemented by one or more network devices within core network 105. In some implementations, a single network device may implement multiple ones of NFs 152-164. Core network 105 may include other NFs not shown in FIG. 1.

PCF 152 may provide policy rules for control plane functions (e.g., for network slicing, roaming, and/or mobility management) and may access user subscription information for policy decisions. AF 154 may provide session related information to PCF 152 in support of policy control rule generation. NEF 156 may expose network capabilities and events provided by NFs to AF 154, and may provide a means for AF 154 to provide information to the network, including other NFs.

AMF 160 may perform connection management, mobility management, access authentication and authorization, and/or security management. SMF 162 performs session management (e.g., session establishment, modification, and release), allocates network addresses to UEs, and selects and controls the UPF 164 for data transfer. UPF 164 performs packet routing and forwarding, packet inspection, and Quality of Service (QoS) handling. UPF 164 may act as a router and a gateway between core network 105 and data network 130 and may forward session data between data network 130 and edge network 110, far edge network 115, and/or C-RAN 120.

Though only a single instance of each NF is shown as residing in core network 105, core network 105 may include multiple instances of certain ones of network functions 152-164. For example, core network 105 may include multiple instances of PCF 152, AF 154, NEF 156, AMF 160, SMF 162, and/or UPF 164 that may reside at various locations in core network 105, or may reside in a same location or area of core network 105. Although instances of NFs are shown in FIG. 1 as residing in core network 105, one or more instances of the NFs may reside in edge network 110 and/or far edge network 115.

Edge network 110 includes, or may be connected to, one or more edge computing data centers (e.g., MEC platforms), or other edge devices, that enable the movement of traffic and network services from core network 105 and/or data network 130 towards the edge of network environment 105 and closer to certain destination devices (e.g., certain UEs). Instead of sending data to core network 105 for processing, routing, and transport, edge network 110 handles the data closer to certain destination devices, thereby reducing latency. In some implementations, edge network 110 may connect to LADN 125-1 at which a MEC platform 170-1 resides. LADN 125-1 may further connect to data network 130. In other implementations, edge network 110 may include LADN 125-1 and MEC platform 170-1. Though not shown in FIG. 1, edge network 110 may include additional instances of one or more of the NFs implemented in core network 105.

Far edge network 115 includes one or more edge computing data centers (e.g., MEC platforms), or other edge devices, that enable the movement of traffic and network services from edge network 110 or core network 105 towards the far edge of network environment 100 and closer to certain destination devices (e.g., certain UEs). Instead of sending data to core network 105 or edge network 110 for processing, routing, and transport, far edge network 115 may handle the data even closer to certain destination devices, thereby reducing latency. In some implementations, far edge network 115 may connect to LADN 125-2 at which a MEC platform 170-2 resides. LADN 125-2 may further connect to data network 130. In other implementations, far edge network 115 may include LADN 125-2 and MEC 170-2. Though not shown in FIG. 1, far edge network 115 may include additional instances of one or more of the NFs implemented in core network 105.

C-RAN 120 may include various types of radio access equipment that perform Radio Frequency (RF) communication with UEs. The radio access equipment of C-RAN 120 may include, for example, multiple distributed Remote Radio Units (RRUs) and at least one C-RAN baseband unit (BBU) hub. Each of the RRUs includes a device(s) that operates as a radio function unit and may include at least one antenna array, transceiver circuitry, and other hardware and software components for enabling the RRUs to receive data via wireless RF signals from UEs, and to transmit wireless RF signals to UEs. Each C-RAN BBU hub includes multiple BBUs that are co-located together, usually in a same physical installation, and which interconnect with the distributed RRUs of CRAN 120 via fronthaul links or a fronthaul network. C-RAN 120 may include additional nodes, functions, and/or components not described herein.

LADNs 125-1 through 125-n (referred to herein individually as "LADN 125" or collectively as "LADNs 125") may each include a local area network that covers a specific geographical area (e.g., a particular set of Tracking Areas). At least one MEC platform 170 may reside in each LADN.

Data network 130 may include any type of packet-switched network, such as, for example, a local area network(s) (LAN), a wide area network(s) (WAN), a metropolitan area network (MAN), and/or the Internet. Data network 130 may include other types of networks not described herein.

OSS 135 may be implemented by one or more network devices and may enable a network service provider (e.g., the network service provider associated with core network 105) to operate, monitor, control, analyze, and manage the services and performance of the provider's network (e.g., core network 105, far edge network 115, edge network 110, C-RAN 120).

Primary MEC orchestrator 140 may be implemented by one or more network devices that perform various functions with respect to orchestrating the use of MEC platforms 170 for UEs serviced by a particular network service provider (e.g., the network service provider associated with core network 105). Primary MEC orchestrator 140 may maintain an overall view of the MEC platforms 170, their available resources, their available services, and a current network topology. The MEC platforms 170 may be owned and operated by the network service provider and/or by third party MEC developers. In circumstances where a particular MEC 170 is owned and operated by a third party MEC developer and the third party MEC developer has its own MEC orchestrator (i.e., a secondary MEC orchestrator 145 shown in FIG. 1), primary MEC orchestrator 140 may interact with the secondary MEC orchestrator 145 to perform MEC orchestration functions.

Secondary MEC orchestrator 145 may be implemented by one or more network devices that perform various functions with respect to orchestrating the use of a first set of MECs 170 for UE traffic, where first set of MECs 170, among a larger set of MECs 170, are owned and/or operated by a third party MEC developer and not by the network service provider associated with core network 105. Though not shown in FIG. 1, different secondary MEC orchestrators 145 may exist, with each secondary MEC orchestrator 145 orchestrating a particular set of MECs 170 owned and/or operated by a particular third party MEC developer.

Weighted DNAI DB 150 may be implemented by one or more network devices that further include memory devices for storing a data structure, such as a database. The data structure stored in DB 150 may include, for example, the tabular data structure described with respect to FIG. 4 below. DB 150 may, however, store other types of data structures (e.g., linked lists, graphs, binary trees, etc.) that further store and maintain the data described with respect to FIG. 4, and/or store other types of data not shown in FIG. 4.

The configuration of network components of network environment 100 shown in FIG. 1 is for illustrative purposes. Other configurations may be implemented. Therefore, network environment 100 may include additional, fewer and/or different components that may be configured in a different arrangement than that depicted in FIG. 1.

Figure 2:
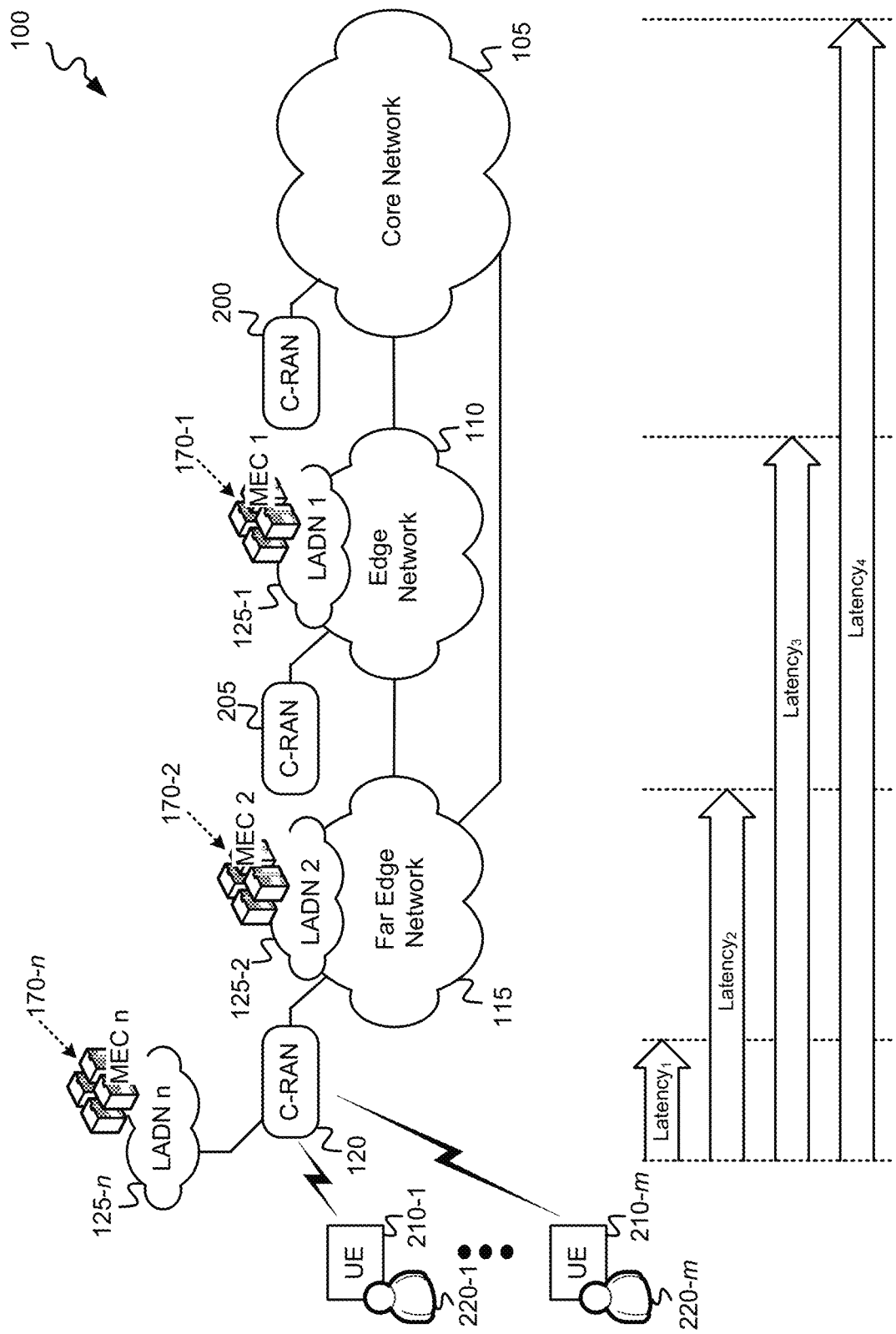
FIG. 2 depicts another view of the network environment of FIG. 1 that shows latencies associated with transport to/from UEs and the far edge network, the edge network, and/or the core network.

FIG. 2 depicts another view of the network environment 100 of FIG. 1 that shows latencies associated with transport to/from UEs 210-1 through 220-$m$ and the far edge network 115, the edge network 110, and/or the core network 105. As shown, in addition to C-RAN 120, an additional C-RAN 205 may connect to edge network 110, and another C-RAN 200 may connect to core network 105. Though not shown in FIG. 2, one or more of UEs 210-1 through 210-$m$ may instead connect to C-RAN 205 or C-RAN 200. Core network 105, edge network 110, far edge network 115, C-RAN 120, C-RAN 205, and C-RAN 200, shown in the network environment 100 of FIG. 2, may be collectively referred to here as the "mobile network."

C-RANs 200 and 205 may include similar equipment and/or components as those described with respect to C-RAN 120 above. UEs 210-1 through 210-$m$ (referred to herein individually as "UE 210" or collectively as "UEs 210") may each include any type of computational device that can wirelessly communicate with far edge network 115, edge network 110, and/or core network 105 via a RAN, such as C-RANs 120, 205, or 200. Each UE 210 may include, for example, a computer (e.g., desktop, laptop, tablet, or wearable computer), a personal digital assistant (PDA), a cellular phone (e.g., a "smart" phone), Voice over Internet Protocol (VoIP) phone, a smart Television (TV), an audio speaker (e.g., a "smart" speaker), a video gaming device, a music player (e.g., a digital audio player), a digital camera, a set-top box (STB), or a "Machine-to-Machine" (M2M) or "Internet of Things" (IoT) device. A "user" 220 may own, operate, administer, and/or carry each UE 210 (e.g., user 220-1 owns, operates, administers and/or carries UE 210-1, user 220-$m$ owns, operates, administers, and/or carries UE 210-$m$, etc.). Network environment 100 may include numerous different UEs 210 that communicate via C-RAN 120, C-RAN 205, or C-RAN 200.

FIG. 2 depicts a first latency $Latency_1$ associated with UE communication via C-RAN 120, LADN 125-$n$ and MEC 170-$n$; and a second latency $Latency_2$ associated with UE communication via C-RAN 120, far edge network 115, LADN 125-2 and MEC 170-2. FIG. 2 further depicts a third latency $Latency_3$ associated with UE communication via C-RAN 120, far edge network 115, edge network 110, LADN 125-1 and MEC 170-1; and a fourth latency $Latency_4$ associated with UE communication via C-RAN 120, far edge network 115, and core network 105. In the network environment 100 shown in FIG. 2, $Latency_1 < Latency_2 < Latency_3 < Latency_4$ such that a latency between a UE 210 and an app executed by either one of MECs 170-$n$, 170-2, and 170-1 decreases as the app processing moves closer to the C-RAN 120 and the communicating UE 210. Therefore, a session involving a UE 210 engaging in data transport, and data processing, with an app executed by MEC 170-$n$ will likely encounter less latency than a session with an app executed by MEC 170-2, an app executed by MEC 170-1, or by an app executed at a node connected to core network 105. Further, a session involving a UE 210 engaging in data transport, and data processing, with an app executed by MEC 170-2 will likely encounter less latency than a session with an app executed by MEC 170-1 or by an app executed at a node connected to core network 105. Additionally, a session involving a UE 110 engaging in data transport, and data processing, with an app executed by MEC 170-1 will likely encounter less latency than a session with an app executed at a node connected to core network 105.

Figure 3:
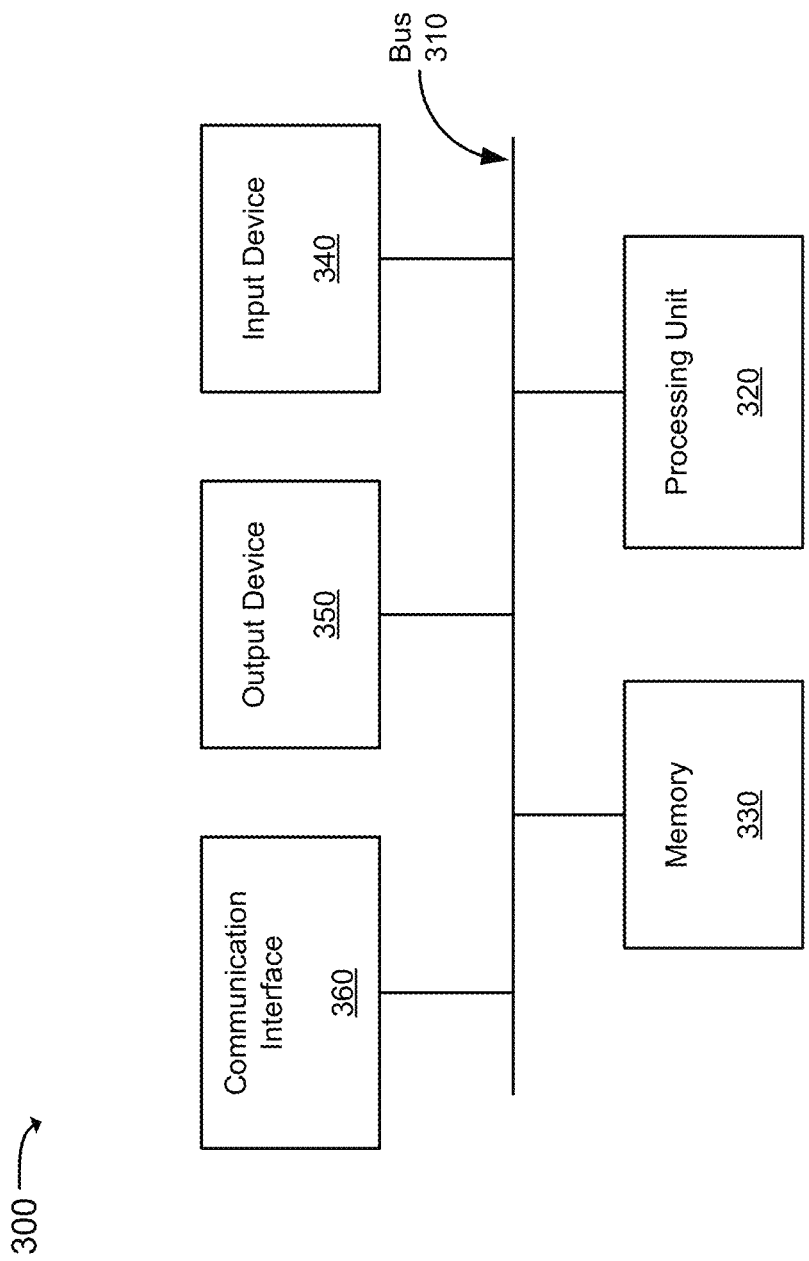
FIG. 3 is a diagram of example components of a network device as referred to herein.

FIG. 3 is a diagram of example components of a network device 300. OSS 135, primary MEC orchestrator 140, secondary MEC orchestrator 145, DB 150, and MECs 170 may each include the same, or similar, components as network device 300 shown in FIG. 3. Further, each of the NFs PCF 152, AF 154, NEF 156, AMF 160, SMF 162 and UPF 164 of FIG. 1 may be implemented by a network device that includes components that are the same as, or similar to, those of device 300. Each of PCF 152, AF 154, NEF 156, AMF 160, SMF 162 and UPF 164 may be implemented by a device 300, while other NFs may be implemented by one or more separate devices 300.

Network device 300 may include a bus 310, a processing unit 320, a memory 330, an input device 340, an output device 350, and a communication interface 360. Bus 310 may include a path that permits communication among the components of device 300. Processing unit 320 may include one or more processors or microprocessors which may interpret or execute stored instructions associated with one or more processes, or processing logic that implements the one or more processes. Processing unit 320 may include software, hardware, or a combination of software and hardware for executing the processes described herein. In some implementations, processing unit 320 may include programmable logic such as Field Programmable Gate Arrays (FPGAs) or accelerators.

Memory 330 may include one or more memory devices for storing data and instructions. Memory 330 may include a random access memory (RAM) or another type of dynamic storage device that may store information and instructions for execution by processing unit 320, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods set forth herein can be implemented as instructions that are stored in memory 330 for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers (e.g., Radio Frequency (RF) transceivers) for communicating via a network(s) (e.g., via C-RANs 120, 205, 200).

Device 300 may perform certain operations or processes, as may be described herein. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium, such as a storage device, or from another device via communication interface 360. The software instructions contained in memory 330 may cause processing unit 320 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes. Other configurations may be implemented. Therefore, network device 300 may include additional, fewer and/or different components, that may be arranged in a different configuration, than depicted in FIG. 3.

Figure 4:
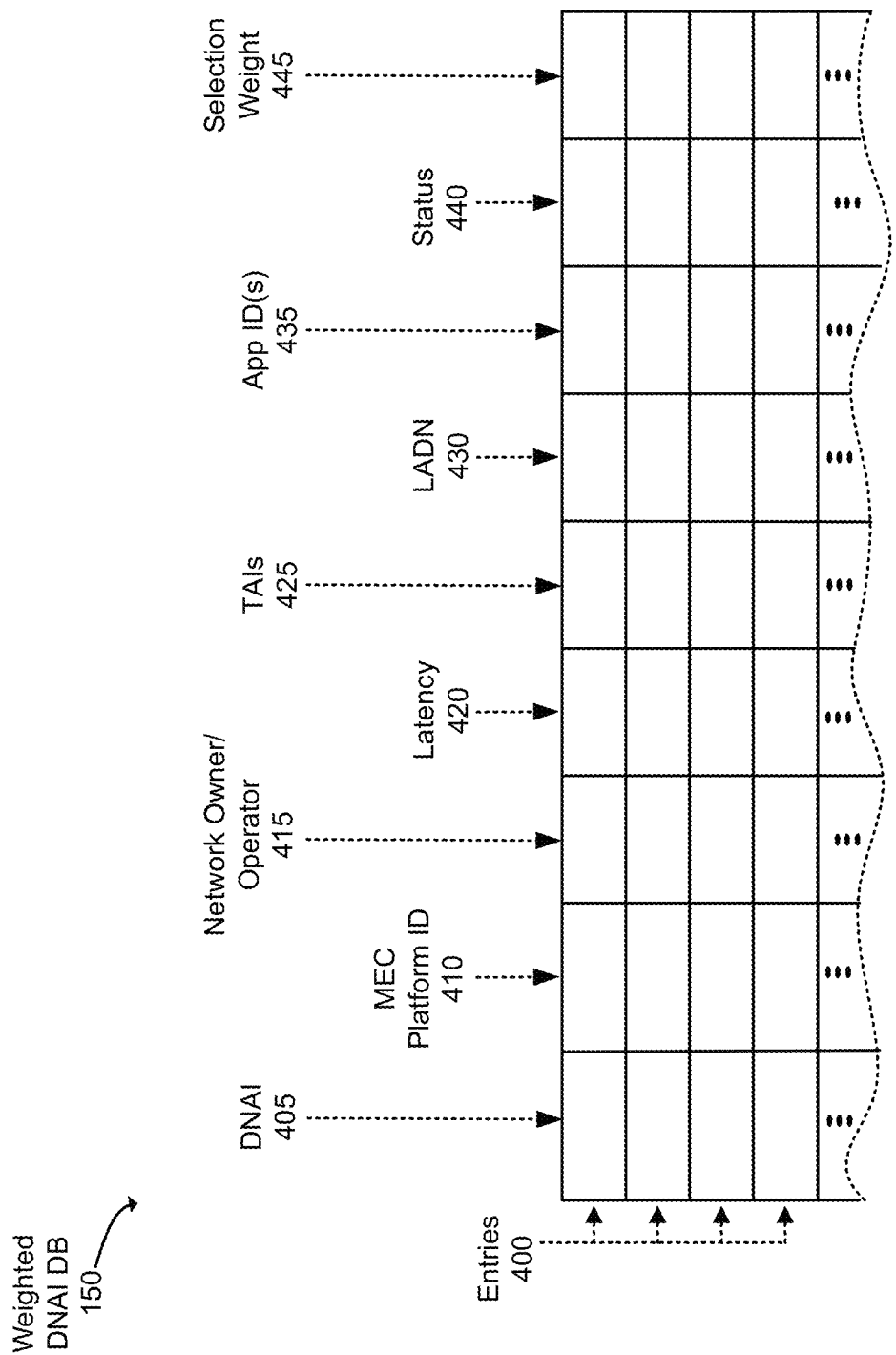
FIG. 4 is a diagram that depicts an example implementation of a data structure that may be stored in a database.

FIG. 4 is a diagram that depicts an example implementation of a data structure that may be stored in weighted DNAI DB 150. As shown, the data structure of DB 150 may include multiple entries 400. Each entry 400 may include a DNAI field 405, a MEC platform ID field 410, a network owner/operator field 415, a latency field 420, a Tracking Area Identifiers (TAIs) field 425, a LADN field 430, an application (app) ID field 435, a status field 440, and a selection weight field 445.

DNAI field 405 stores a DNAI access identifier associated with the MEC platform identified in the corresponding field 410 of the entry 400. MEC platform ID field 410 stores a unique identifier (ID) associated with the MEC platform at which the application, having the app ID stored in the corresponding field 435 of the entry 400, is installed. Network owner/operator field 415 stores a unique identifier that identifies the organization or entity that owns and/or operates the MEC platform identified in the corresponding field 410 of the entry 400.

Latency field 420 stores a known latency parameter associated with data transport from a UE 210 to/from the MEC platform identified in the corresponding field 410 of the entry 400. TAIs field 425 stores the one or more TAIs from which UE sessions are to be serviced by the MEC platform(s) identified in the corresponding field 410 of the entry 400. LADN field 430 stores an identifier of the LADN to which the MEC platform, identified in the corresponding field 410 of the entry 400, is connected. App ID(s) field 435 stores one or more unique app IDs of applications that are installed at the MEC platform, identified in the corresponding field 410 of the entry 400, for processing data associated with sessions with UEs 210.

Status field 440 stores data that indicates a current status (e.g., active, inactive, unavailable, available) of the MEC platform identified in the corresponding field 410 of the entry 400. Selection weight field 445 stores a current MEC selection weight for the MEC platform identified in field 410, that stores and executes the app identified in field 435, and is associated with the latency identified in field 420 of the entry 400.

To locate a particular entry 400, the data structure of DB 150 may be queried with, for example, a desired latency value to locate an entry 400 having a matching latency value stored in field 420. When such an entry 400 is located, data may be stored in one or more of fields 405, 410, 415, 420, 425, 430, 435, 440, and/or 445, or data may be retrieved from one or more of fields 405, 410, 415, 420, 425, 430, 435, 440 and/or 445. Other fields, or multiple fields, of an entry 400, instead of latency field 420 by itself, may be used for querying the data structure of DB 150.

Figure 5:
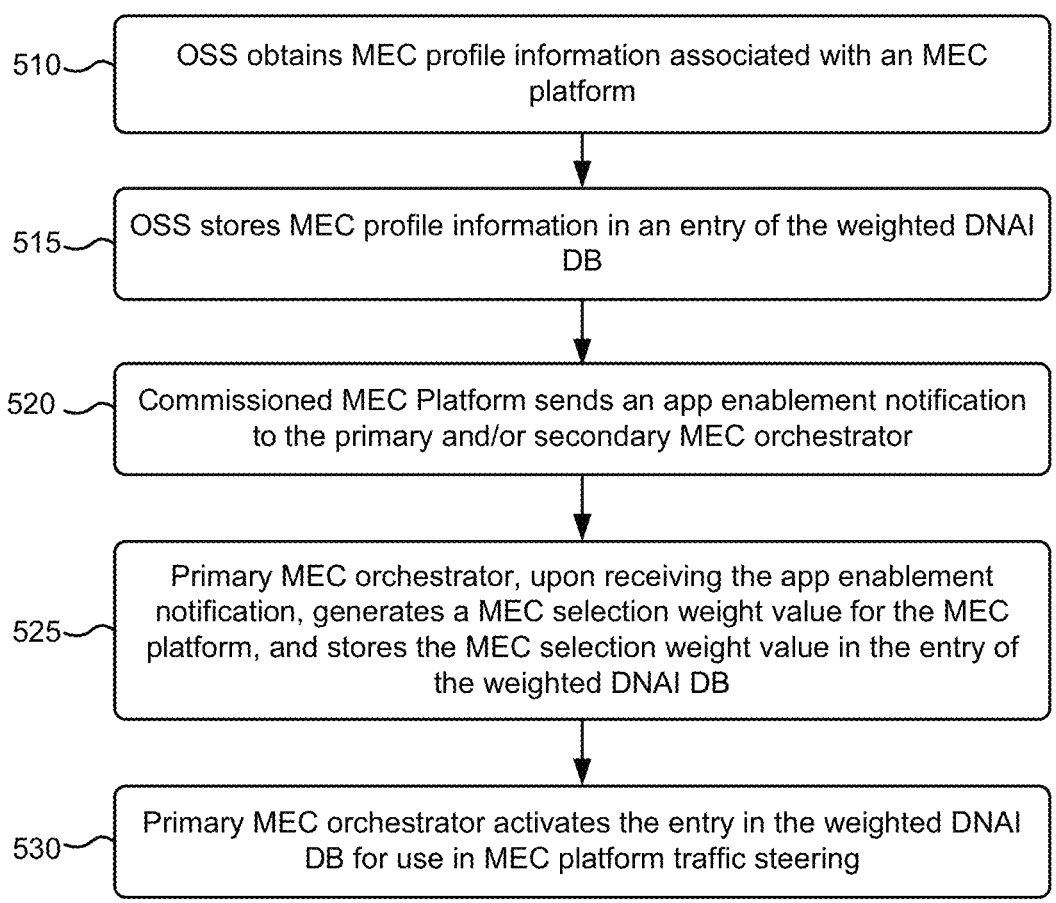
FIG. 5 is a flow diagram of an example process for commissioning an MEC platform and generating an Multi-Access Edge Computing selection weight value for the MEC platform.
Figure 6:
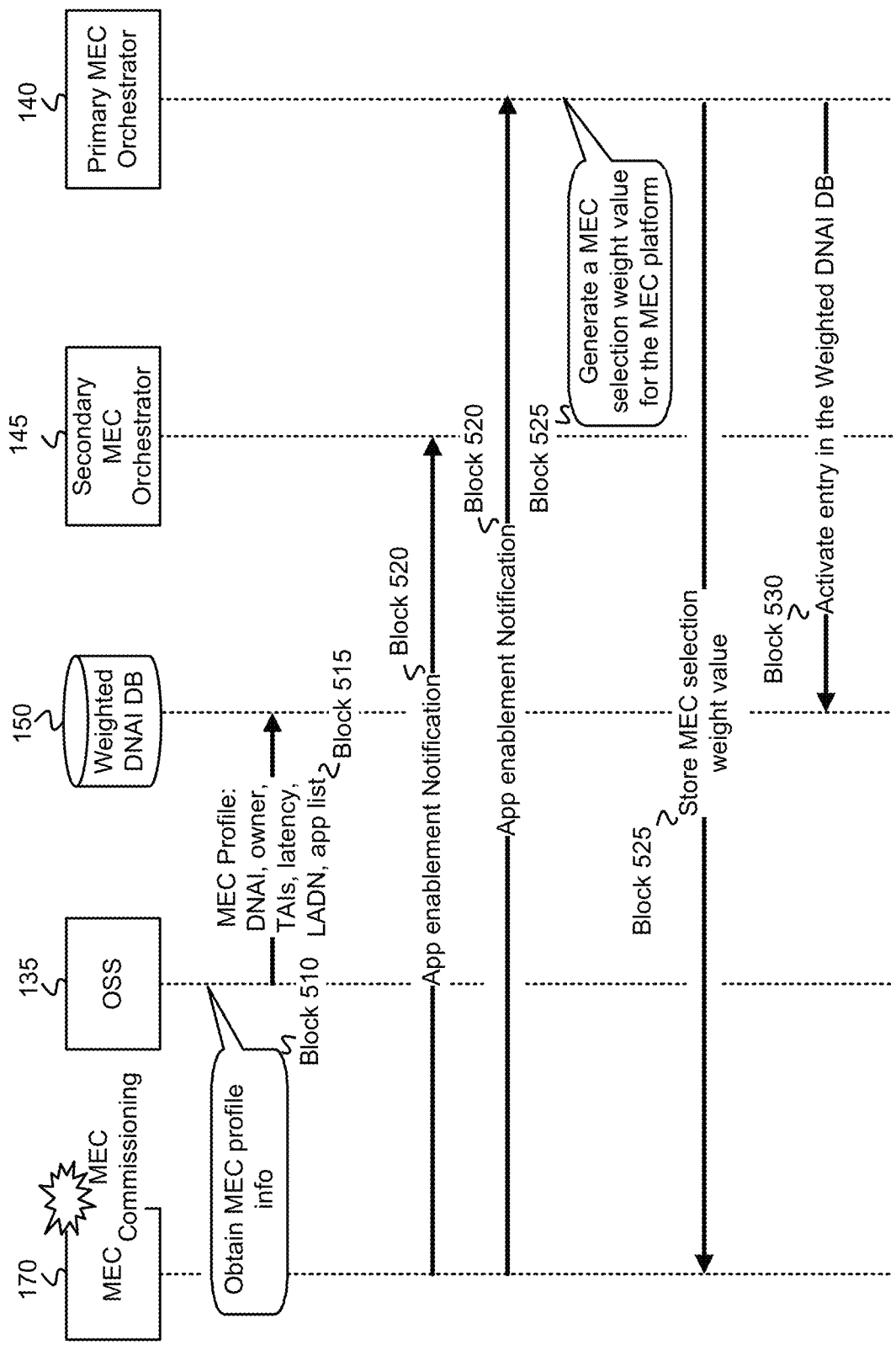
FIG. 6 is a diagram that depicts sequences of operations, messages, and/or data flows associated with the process of FIG. 5.

FIG. 5 is a flow diagram of an example process associated with the commissioning of a MEC platform and generating a MEC selection weight value for the MEC platform for storage in weighted DNAI DB 150. The example process of FIG. 5 may be implemented by OSS 135 in conjunction with primary MEC orchestrator 140 and/or secondary MEC orchestrator 145 and weighted DNAI DB 150. Execution of the various blocks of the flow diagram of FIG. 5 is further shown in FIG. 6.

The exemplary process may include OSS 135 obtaining MEC profile information associated with a newly commissioned MEC platform 170 (block 510). Existing techniques may be used for commissioning a new MEC platform 170 that connects to a particular LADN 125. The MEC profile information obtained by OSS 135 may include, for example, the DNAI associated with the MEC platform 170, the ID of the MEC platform 170, the owner/operator ID associated with the MEC platform 170, the latency value associated with the MEC platform 170, the TAIs serviced by the MEC platform 170, the LADN ID of the LADN to which the MEC platform 170 connects, and a list of a set of one or more apps that are executed by the MEC platform 170.

OSS 135 stores the MEC profile information in an entry 400 of the weight DNAI DB 150 (block 515). OSS 135 may store various data of the MEC profile in different fields of an entry 400 of DB 150. For example, the DNAI associated with the MEC platform 170 may be stored in DNAI field 405, the ID of the MEC platform 170 may be stored in field 410, the ID of the network/operator of the MEC platform 170 may be stored in field 415, the latency value may be stored in field 420, the TAIs serviced by the MEC platform 170 may be stored in field 425, an ID of the LADN to which the MEC platform 170 connects may be stored in field 430, the app ID(s) of the app(s) executed by MEC platform 170 may be stored in field 435, and the current status of the MEC platform 170 may be stored in field 440.

The commissioned MEC platform 170 sends an application enablement notification to the primary MEC orchestrator 140 and/or the secondary MEC orchestrator 145 (block 520). Once MEC platform 170 is commissioned, the MEC platform 170 generates a notification for notifying the primary MEC orchestrator 140 and/or the secondary MEC orchestrator 145 of the particular apps that are enabled at the MEC platform 170. The notification may include an ID of the MEC platform 170 and an ID of each application that is enabled at the MEC platform 170.

The primary MEC orchestrator 140, upon receiving the application enablement notification, generates a MEC selection weight value for the newly commissioned MEC platform, and stores the MEC selection weight value in the entry 400 of the weighted DNAI DB 150 (block 525) and activates the entry 400 in the weighted DNAI DB 150 for use in MEC platform traffic steering (block 530). Generation of the MEC selection weight value may include applying a function to one or more items of data of the MEC profile such as, for example, the latency value stored in field 420, the status stored in field 400, and/or the DNAI stored in field 405. Additionally, the function may be applied to other items of data associated with the MEC platform 170. In one implementation, the function may include a linear function in which the values of the dependent variable decreases linearly as the latency value decreases, or increases linearly as the latency value increases. Thus, in this implementation, a MEC platform 170 associated with a lower latency value may have a lower MEC selection weight value. Other types of functions may be applied to the one or more items of data of the MEC profile, and/or other items of data associated with the MEC platform 170, to generate a MEC selection weight value. The MEC selection weight value may serve as a "cost" that may be used to select a MEC platform among multiple different MEC platforms.

Blocks 510-530 may be repeated for each newly deployed MEC platform 170. Therefore, multiple instances of the example process of FIG. 5 may be repeated in parallel for each newly deployed MEC platform. Additionally, blocks 510-530 may be repeated when any data within the MEC profile for a MEC platform 170 is updated or changed (e.g., the latency value associated with the MEC platform 170 changes, an application(s) is added or removed from a MEC platform, an application(s) installed at an MEC platform changes capabilities or alters its latency requirement).

Figure 7:
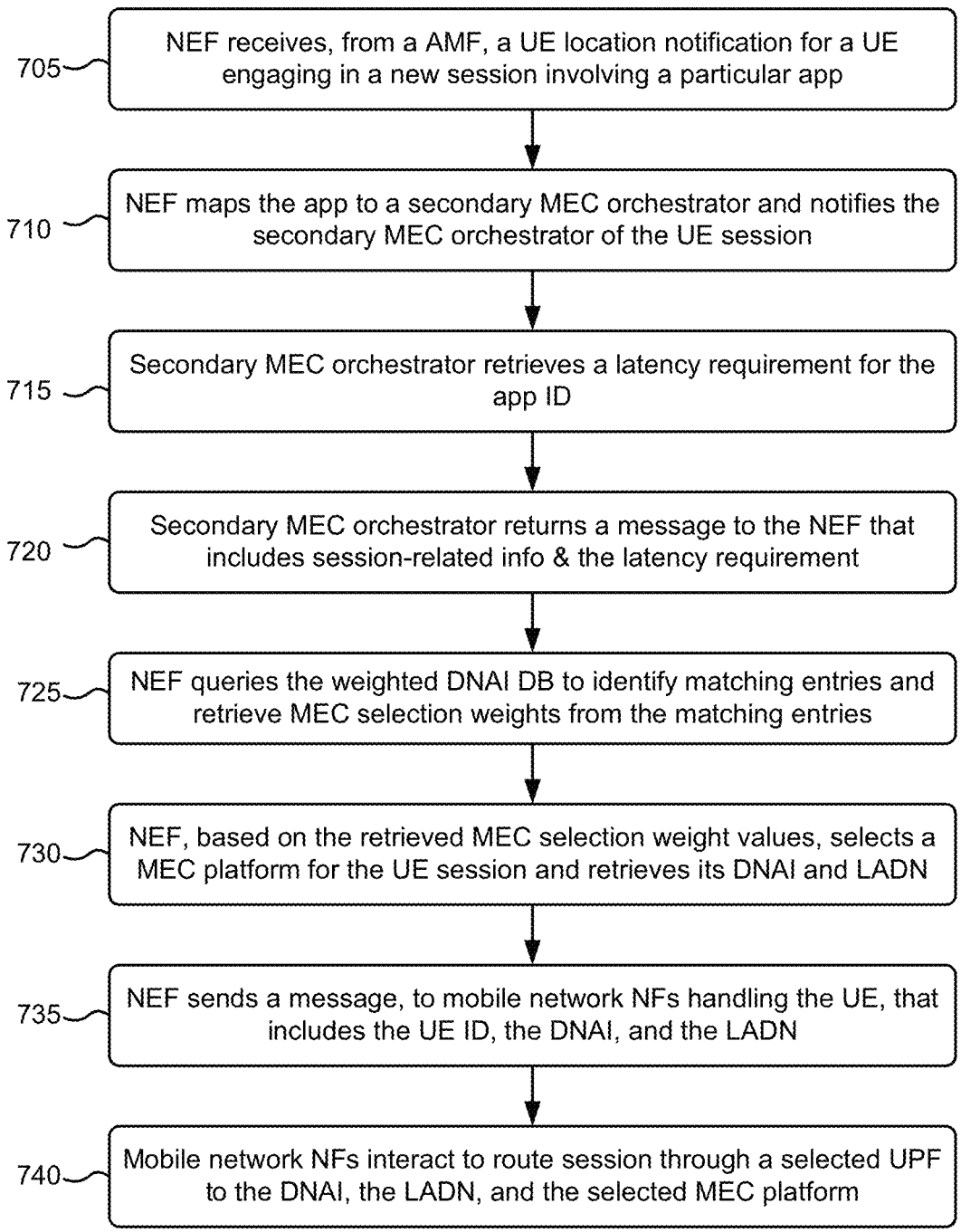
FIG. 7 is a flow diagram of an example process for using MEC selection weight values for steering traffic for a User Equipment device (UE) session to a particular MEC platform.
Figure 8:
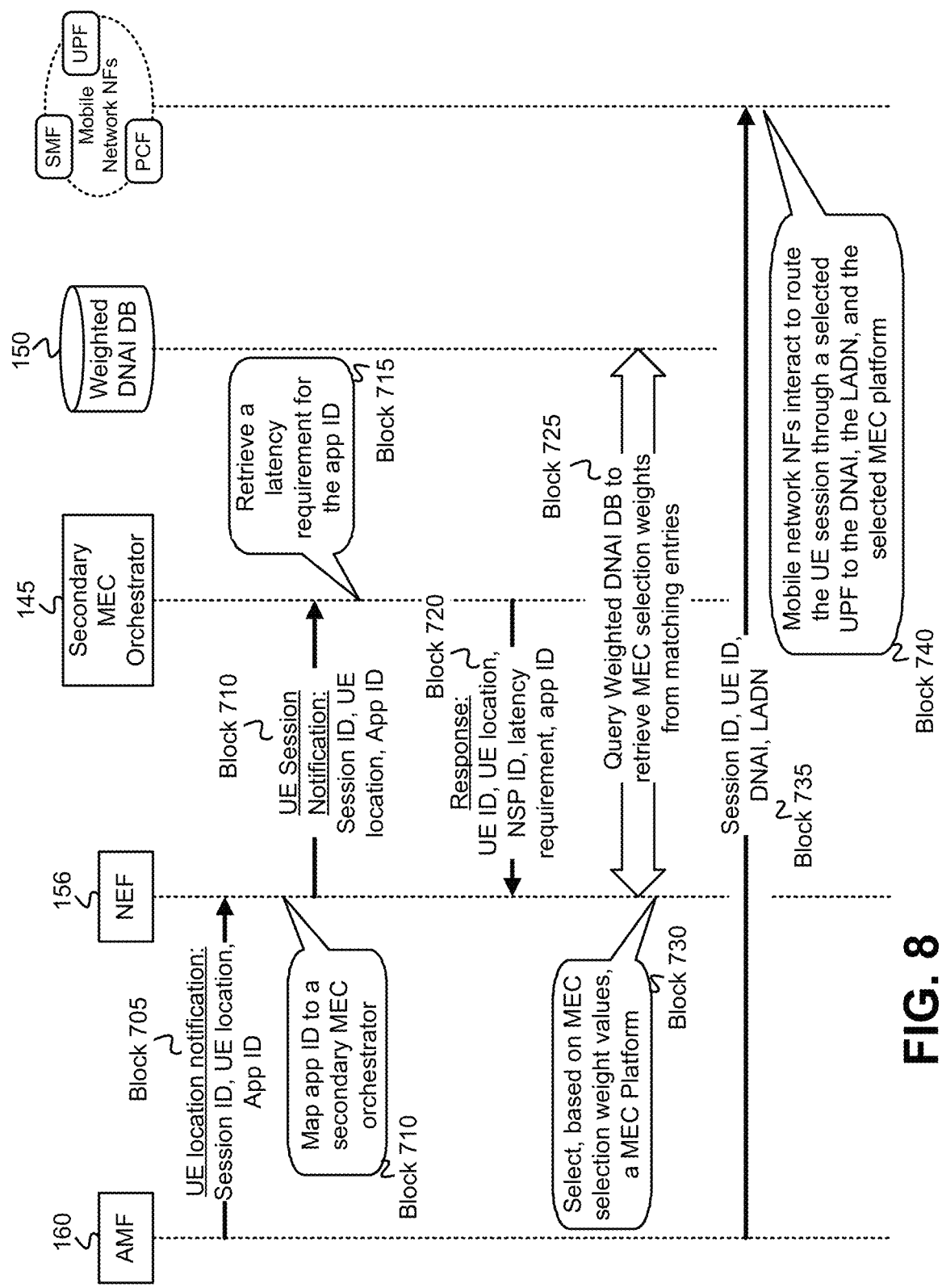
FIG. 8 is a diagram that depicts sequences of operations, messages, and/or data flows associated with the process of FIG. 7.

FIG. 7 is a flow diagram of an example process for using MEC selection weight values for steering traffic for a UE session to a particular MEC platform 170 via the C-RAN 120, the far edge network 115, the edge network 110, or the core network 105. The example process of FIG. 7 may be implemented by a NEF 156, in cooperation with secondary MEC orchestrator 145, and NFs of the mobile network. Execution of the various blocks of the flow diagram of FIG. 7 is further shown in FIG. 8.

The example process may include NEF 156 receiving, from an AMF 160, a UE location notification for a UE 210 engaging in a new session involving a particular application (block 705). The UE 210, located within a particular TAI within the mobile network, may initiate a transport session that involves use of a particular application. For example, the UE 210 may initiate a video streaming session involving a video streaming application. The AMF 160 generates a UE location notification, that includes location information for the UE 210 (e.g., its current TAI), a session ID, and an ID of the application involved in the session. The AMF 160 sends the UE location notification to NEF 156 in the mobile network.

The NEF 156 maps the application to a secondary MEC orchestrator 145 and notifies the secondary MEC orchestrator 145 of the UE session (block 710). The NEF 156 may consult a data structure, either stored locally or in an external node, to map the app ID received in the UE location notification from AMF 160 to a particular MEC orchestrator ID of the secondary MEC orchestrator 145 that orchestrates the MEC platform(s) which executes the app corresponding to the app ID. The NEF 156 generates a UE session notification, that includes the session ID, the UE 210's current location information (e.g., the UE's TAI), and the app ID, and sends the notification to the identified secondary MEC orchestrator 145.

The MEC secondary orchestrator 145 retrieves a latency requirement for the app ID (block 715) and returns a message to the NEF 156. The message includes session-related information and the retrieved latency requirement for the app ID (block 720). The MEC secondary orchestrator 145 may store latency requirements associated with each app ID such that transport sessions involving each application should experience sufficient network performance for each particular application. For example, an application app_x may require a latency of lat_x for the service it provides and an application app_y may require a latency of lat_y for the service it provides. When a MEC secondary orchestrator 145 receives the app ID for app_x, orchestrator 145 retrieves the latency requirement of lat_x from memory to return to the NEF 156. In one implementation, the MEC secondary orchestrator 145 may generate a "TrafficInfluenceCreate" message that includes the UE ID, the UE location information (e.g., TAI), the network service provider ID, the retrieved latency requirement of the application, and the app ID of the application.

The NEF 156 queries the weighted DNAI DB 150 to identify matching entries and then retrieve MEC selection weights from the matching entries (block 725). The NEF 156 queries the weighted DNAI DB 150 by comparing the UE 210's current location information (e.g., the UE's TAI), the latency requirement (received in block 720), and the app ID, with the data stored in fields 425, 420, and 435, to identify entries 400 having matching data in fields 425, 420 and 435. For example, NEF 156 may compare the UE 210's current location information with TAIs stored in field 425, and the app ID with data stored in field 435, of the multiple entries 400 of DB 150 to identify one or more entries 400 having matching data (e.g., a matching TAI and a matching app ID). Additionally, NEF 156 may compare the received latency requirement with the data stored in field 420 of the multiple entries 400 of DB 150 to identify one or more of the matching entries 400 having a latency value stored in field 420 that is less than or equal to the received latency requirement. Furthermore, NEF 156 may analyze the status field 440 of the entries identified as described above to determine entries 400, as matching entries, having a status of "available" and/or "active." The identified entries 400 having a status in fields 440 of "unavailable" or "inactive" may be disregarded and no longer considered as "matching." Upon identification of the matching entries 400 in DB 150, NEF 156 retrieves the selection weight values stored in fields 445 of the matching entries 400.

The NEF 156, based on the retrieved selection weight values, selects a MEC platform 170 for the UE session and retrieves the selected MEC platform 170's DNAI and LADN (block 730). NEF 156 may apply a selection algorithm to the selection weight values retrieved from the matching entries 400 of DB 150. Various types of selection algorithms may be used on NEF 156 for selecting a MEC platform 170 based on the retrieved selection weight values. In one implementation, NEF 156 may use a "least cost" selection algorithm, where the MEC selection weight values are considered to be "cost" values, and the selection algorithm compares the "cost" values retrieved from the matching entries 400 of DB 150 and selects the lowest "cost" value (i.e., selects the lowest MEC selection weight value). Other types of selection algorithms, that apply different criteria to the MEC selection weights, may be used. Upon selection of the MEC platform 170, NEF 156 retrieves a LADN ID from field 430, and a DNAI ID from field 405 of the matching entry 400 for the selected MEC platform 170.

The NEF 156 sends a message, to core network NFs handling the UE, that includes the UE ID, the DNAI, and the LADN (block 735). In one implementation, the NEF 156 may generate a "TrafficInfluenceCreate" message that includes the UE ID, the DNAI, the LADN, and possibly other data used by the mobile network NFs for routing the data session. The mobile network NFs, upon receipt of the NEF 156's message, interact to route the UE's session through a selected UPF to the DNAI, the LADN, and the selected MEC platform 170 (block 740). The mobile network NFs (e.g., AMF 160, SMF 162, UPF 164) may use the UE ID, the DNAI, and the LADN to route data for the session to the selected MEC platform 170 via one of C-RAN 120, far edge network 115, or edge network 110. The mobile network NFs, thus, direct the session to be established between the selected MEC platform 170 and the UE 210 via, for example, C-RAN 120, far edge network 115, or edge network 110.

Blocks 705-740 may be repeated for each new UE session that may involve handling and processing of the data of the session by a MEC platform 170 connected at a location (e.g., C-RAN 120, far edge network 115, or edge network 110) that is closer to UE 210 than, for example, core network 105. Therefore, multiple instances of the exemplary process of FIG. 7 may be repeated in parallel for multiple sessions involving one or more UEs 210.

Figure 9A:
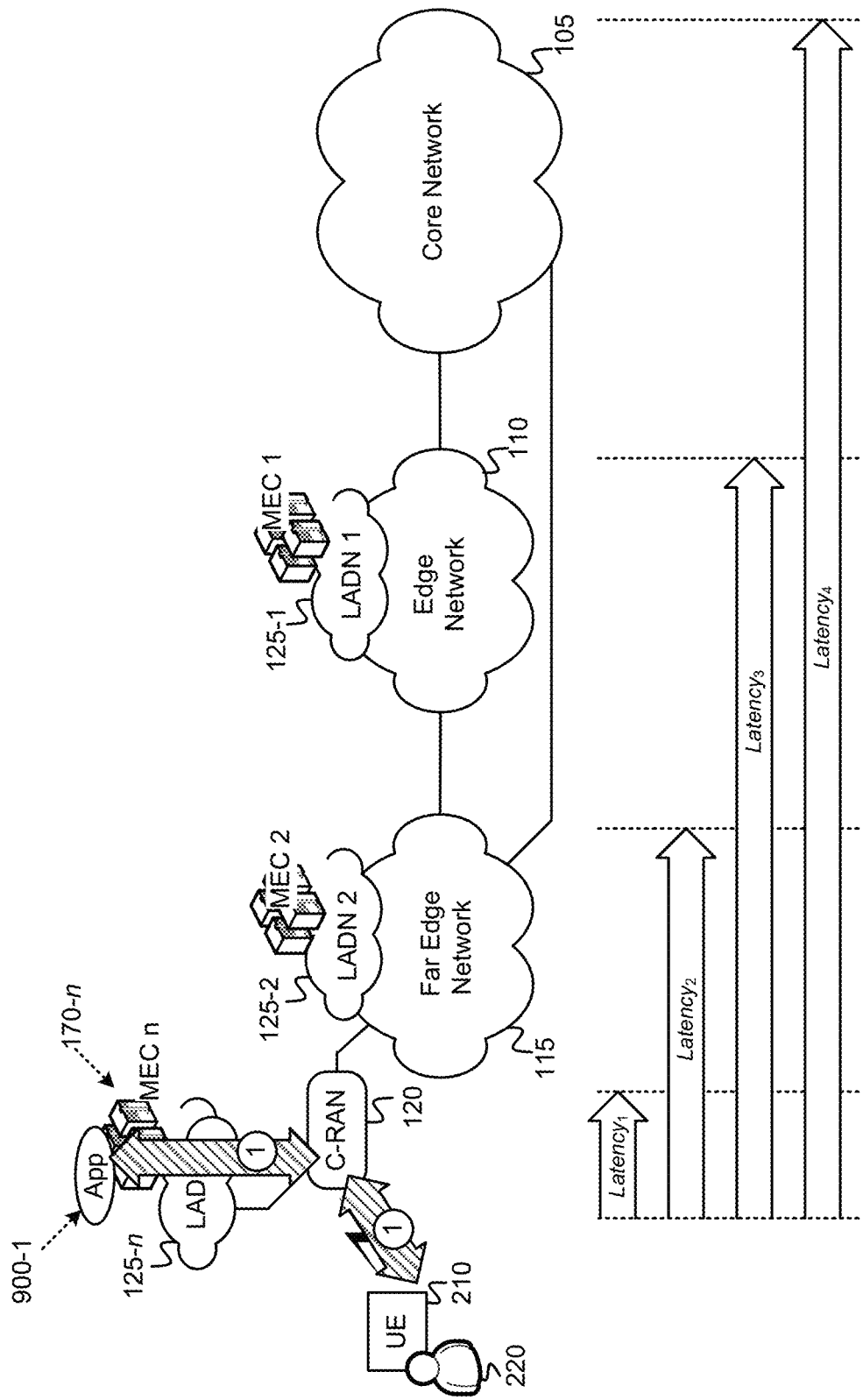
FIGS. 9A-9D illustrate examples of the routing of a transport session from a UE to an application executing at a MEC platform.

FIGS. 9A-9D illustrate examples of the routing of transport sessions (e.g., as described with respect to block 740 of the process of FIG. 7 above) from a UE 210 to an application executing at a MEC 170 via C-RAN 120, far edge network 115, edge network 110, and/or core network 105, and the various latencies encountered by the different transport sessions. In the example of FIG. 9A, a transport session involving a UE 210 may be routed (as described with respect to block 740 of FIG. 7 above) by NFs of the mobile network via C-RAN 120 and LADN 125-$n$ to an application 900-1 executed by MEC 170-$n$. The transport session (identified with a "1" within a circle in FIG. 9A) may experience a latency of Latency$_1$. Given the very close proximity of MEC 170-$n$ to UE 210 due to transport via C-RAN 120, the latency Latency$_1$ is likely lower than the latencies encountered by transport sessions routed to/from UE 210 via far edge network 115, edge network 110, or core network 105.

Figure 9B:
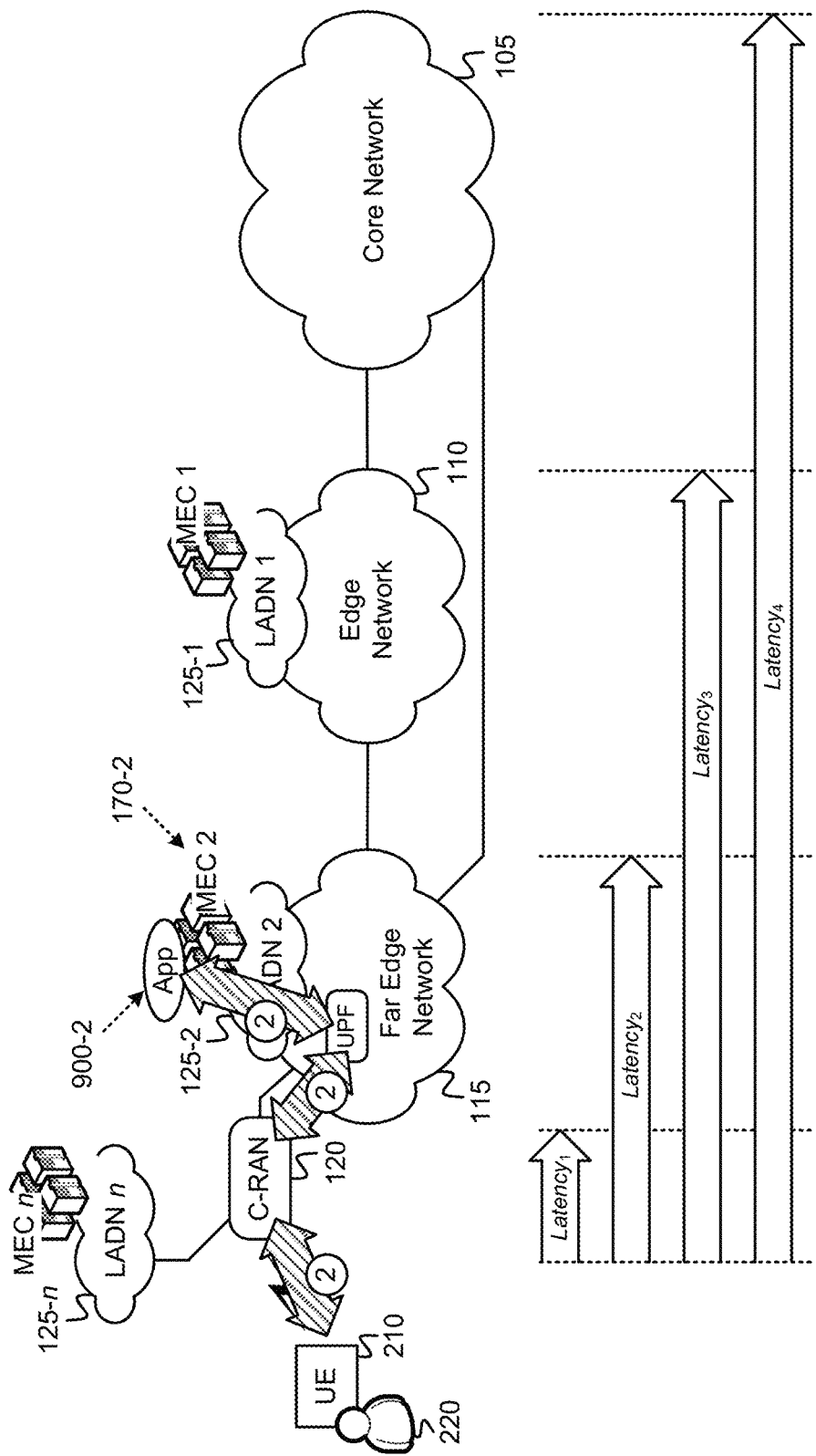

In the example of FIG. 9B, a transport session involving the UE 210 may be routed via NFs of the mobile network via C-RAN 120, far edge network 115, and LADN 125-2 to an application 900-2 executed by MEC 170-2. The transport session (identified with a "2" within a circle in FIG. 9B) may experience a latency of Latency$_2$, where Latency$_1$<Latency$_2$. Given the closer proximity of far edge network 115 and MEC 170-2 to UE 210, relative to transport via edge network or core network 105, the latency Latency$_2$ is likely lower than the latencies encountered by transport sessions routed to/from UE 210 via edge network 110, or core network 105.

Figure 9C:
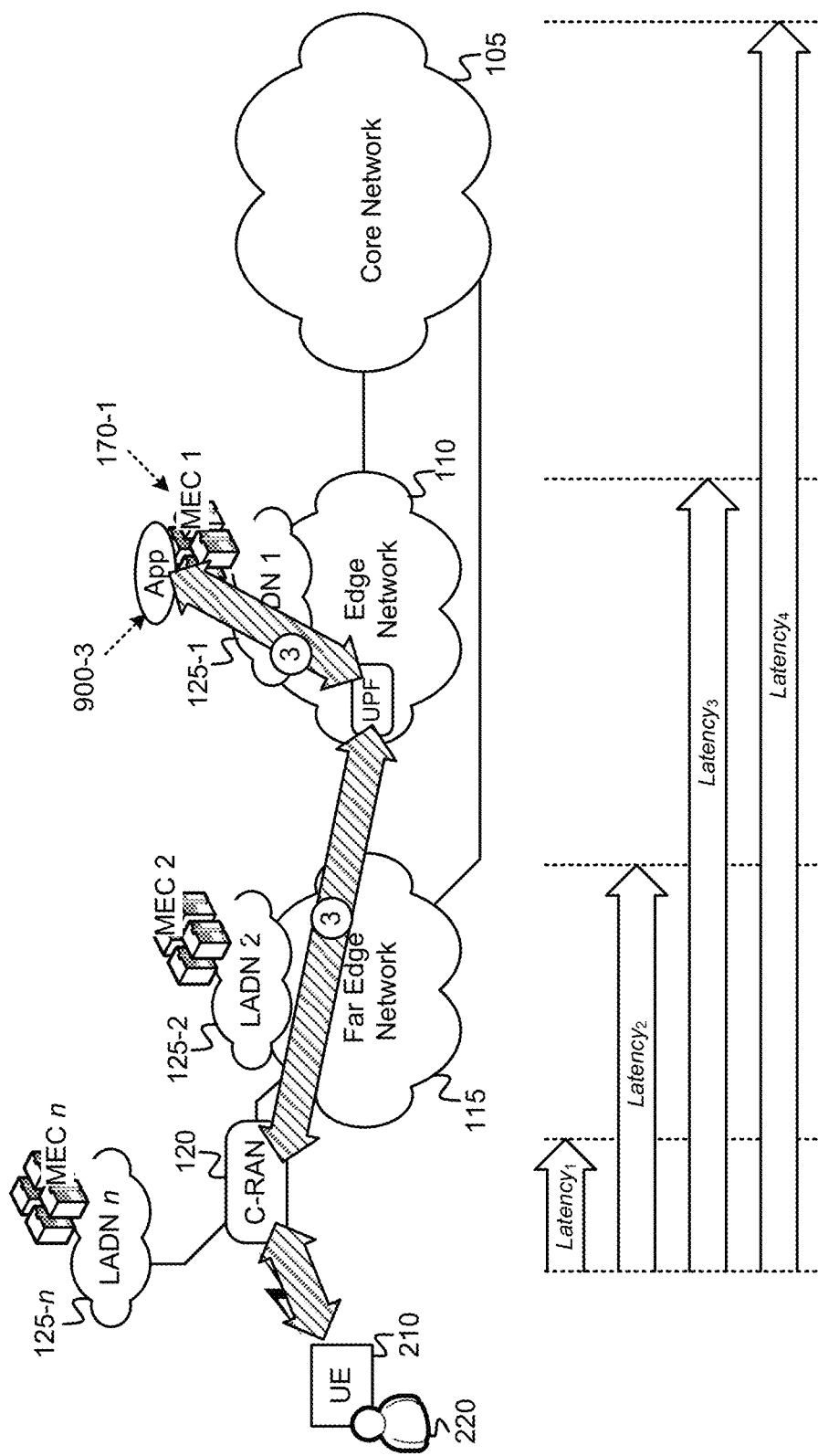

In the example of FIG. 9C, a transport session involving the UE 210 may be routed by NFs of the mobile network via C-RAN 120, far edge network 115, edge network 110, and LADN 125-1 to an application 900-3 executed by MEC 170-1. The transport session (identified with a "3" within a circle in FIG. 9C) may experience a latency of Latency$_3$, where Latency$_1$<Latency$_2$<Latency$_3$. Given the closer proximity of edge network 110 and MEC 170-1 to UE 210, relative to transport via core network 105, the latency Latency$_3$ is likely lower than the latency encountered by transport sessions routed to/from UE 210 via core network 105.

Figure 9D:
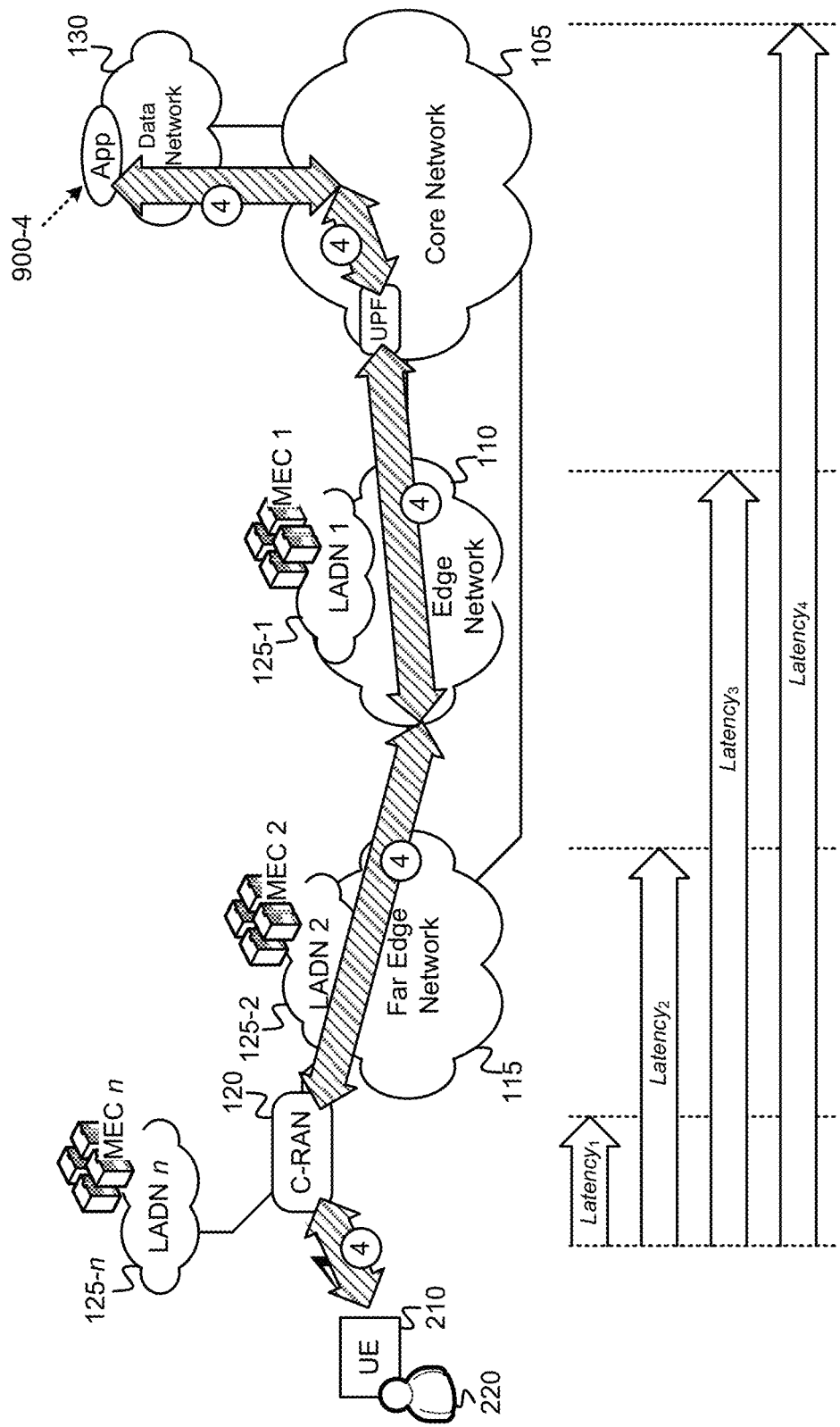

In the example of FIG. 9D, a transport session involving the UE 210 may be routed by NFs of the mobile network via C-RAN 120, far edge network 115, edge network 110, core network 105, and data network 130 to an application 900-4 executed by a network device (not shown) connected to data network 130. The transport session (identified with a "4" within a circle in FIG. 9D) may experience a latency of Latency$_4$, where Latency$_1$<Latency$_2$<Latency$_3$<Latency$_4$. Given the large distance between UE 210 and the network device executing app 900-4 connected to data network 130 and core network 105, the latency Latency$_4$ is likely higher than the latencies encountered by the transport sessions routed to/from UE 210 as described above with respect to FIGS. 9A-9C.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 7, and sequences of operations, messages, and/or data flows with respect to FIGS. 6 and 8, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device.

A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device in a mobile network, a tracking area identifier (TAI) associated with a location of a user equipment device (UE) in the mobile network and a latency requirement associated with a data session involving the UE;
   retrieving from a database, based on the TAI associated with the UE and the latency requirement, Multi-Access Edge Computing (MEC) selection weight values, associated with multiple MEC platforms, generated by applying a function to multiple items of data of each MEC profile associated with each MEC platform of the multiple MEC platforms, wherein the items of data of each MEC profile comprises:
   first data identifying a Data Network Access Identifier (DNAI) for the MEC platform,
   second data identifying an owner or operator associated with the MEC platform,
   third data comprising a latency value associated with the MEC platform,
   fourth data identifying Tracking Area Identifiers (TAIs) serviced by the MEC platform, and
   fifth data identifying a current status of the MEC platform;
   selecting a MEC platform, from among the multiple MEC platforms, based on the retrieved MEC selection weight values; and
   directing the data session to be established between the selected MEC platform and the UE.

2. The method of claim 1, wherein retrieving from the database further comprises:
   performing a lookup into the database using the TAI associated with the location of the UE and the latency requirement to retrieve the MEC selection weight values.

3. The method of claim 1, wherein selecting the MEC platform further comprises:
   comparing the MEC selection weight values among one another to identify the lowest valued MEC selection weight value; and
   identifying the MEC platform that is associated with the lowest valued MEC selection weight value as the selected MEC platform.

4. The method of claim 1, further comprising:
   retrieving, from the database, a Data Network Access ID (DNAI) and a Local Access Data Network (LADN) ID associated with the selected MEC platform.

5. The method of claim 4, wherein causing the data session to be routed further comprises:
   sending, by the network device, a message to one or more mobile network functions (NFs) handling the UE to facilitate establishing the data session,
   wherein the message includes an ID of the UE, and the DNAI and the LADN ID associated with the selected MEC platform.

6. The method of claim 1, wherein the multiple MEC platforms are each connected to a different one of a Radio Access Network (RAN), a far edge network, or an edge network.

7. The method of claim 1, wherein the network device executes a Network Exposure Function (NEF).

8. A network device, comprising:
   a communication interface to receive a tracking area identifier (TAI) associated with a location of a user equipment device (UE) in a mobile network and a latency requirement associated with a data session involving the UE; and
   one or more processors or logic to:
   retrieve from a database, based on the TAI associated with the UE and the latency requirement, Multi-Access Edge Computing (MEC) selection weight values, associated with multiple MEC platforms, generated by applying a function to multiple items of data of each MEC profile associated with each MEC platform of the multiple MEC platforms, wherein the items of data of each MEC profile comprises:
   first data identifying a Data Network Access Identifier (DNAI) for the MEC platform,
   second data identifying an owner or operator associated with the MEC platform, third data comprising a latency value associated with the MEC platform,
fourth data identifying Tracking Area Identifiers (TAIs) serviced by the MEC platform, and
fifth data identifying a current status of the MEC platform,
select a MEC platform, from among the multiple MEC platforms, based on the retrieved MEC selection weight values, and
cause the data session to be established between the selected MEC platform and the UE.

9. The network device of claim 8, wherein, when retrieving from the database, the one or more processors or logic further:
performs a lookup into the database using the TAI associated with the location of the UE and the latency requirement to retrieve the MEC selection weight values.

10. The network device of claim 8, wherein, when selecting the MEC platform, the one or more processors or logic further:
compares the MEC selection weight values among one another to identify the lowest valued MEC selection weight value; and
identifies the MEC platform that is associated with the lowest valued MEC selection weight value as the selected MEC platform.

11. The network device of claim 8, wherein the one or more processors, or logic, further:
retrieves, from the database, a Data Network Access ID (DNAI) and a Local Access Data Network (LADN) ID associated with the selected MEC platform.

12. The network device of claim 11, wherein, when causing the data session to be established, the one or more processors or logic further:
sends a message to one or more mobile network functions (NFs) handling the UE to facilitate establishing the data session,
wherein the message includes an ID of the UE, and the DNAI and the LADN ID associated with the selected MEC platform.

13. The network device of claim 8, wherein the multiple MEC platforms are each connected to a different one of a Radio Access Network (RAN), a far edge network, or an edge network.

14. The network device of claim 8, wherein the network device executes a Network Exposure Function (NEF).

15. A non-transitory storage medium storing instructions executable by a network device, wherein the instructions comprise instructions to cause the network device to:
receive a tracking area identifier (TAI) associated with a location of a user equipment device (UE) in a mobile network and a latency requirement associated with a data session involving the UE;
retrieve from a database, based on the TAI associated with the UE and the latency requirement, Multi-Access Edge Computing (MEC) selection weight values, associated with multiple MEC platforms, generated by applying a function to multiple items of data of each MEC profile associated with each MEC platform of the multiple MEC platforms, wherein the items of data of each MEC profile comprises:
first data identifying a Data Network Access Identifier (DNAI) for the MEC platform,
second data identifying an owner or operator associated with the MEC platform,
third data comprising a latency value associated with the MEC platform,
fourth data identifying Tracking Area Identifiers (TAIs) serviced by the MEC platform, and
fifth data identifying a current status of the MEC platform;
select a MEC platform, from among the multiple MEC platforms, based on the retrieved MEC selection weight values; and
cause the data session to be established between the selected MEC platform and the UE.

16. The non-transitory storage medium of claim 15, wherein the instructions to cause the network device to retrieve from the database further comprise instructions to cause the network device to:
perform a lookup into the database using the TAI associated with the location of the UE and the latency requirement to retrieve the MEC selection weight values.

17. The non-transitory storage medium of claim 15, wherein the instructions to cause the network device to select the MEC platform further comprise instructions to cause the network device to:
compare the MEC selection weight values among one another to identify the lowest valued MEC selection weight value; and
identify the MEC platform that is associated with the lowest valued MEC selection weight value as the selected MEC platform.

18. The non-transitory storage medium of claim 15, wherein the instructions further comprise instructions to cause the network device to:
retrieve, from the database, a Data Network Access ID (DNAI) and a Local Access Data Network (LADN) ID associated with the selected MEC platform.

19. The non-transitory storage medium of claim 18, wherein the instructions to cause the data session to be routed further comprise instructions to cause the network device to:
send a message to one or more mobile network functions (NFs) handling the UE to facilitate establishing the data session,
wherein the message includes an ID of the UE, and the DNAI and the LADN ID associated with the selected MEC platform.

20. The non-transitory storage medium of claim 15, wherein the multiple MEC platforms are each connected to a different one of a Radio Access Network (RAN), a far edge network, or an edge network.

* * * * *